A. F. JENKINS.
CUTTING AND WELDING TORCH.
APPLICATION FILED FEB. 21, 1918.
1,274,053.
Patented July 30, 1918.
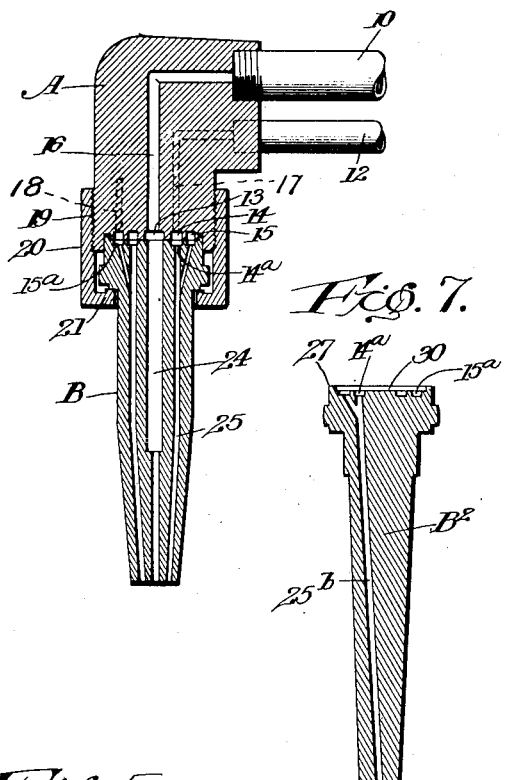
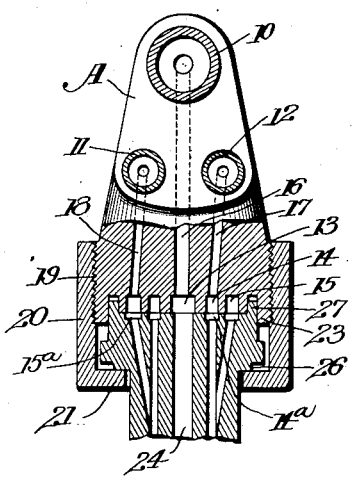
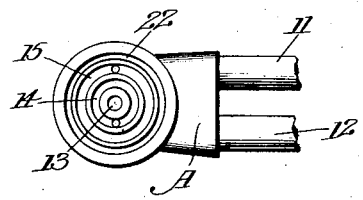
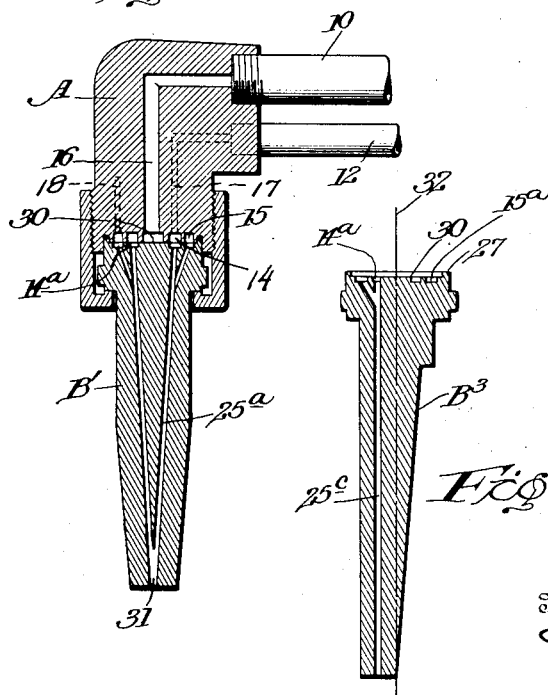
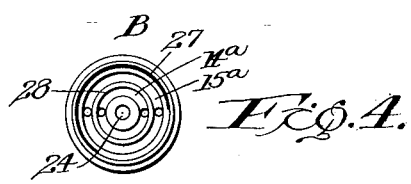
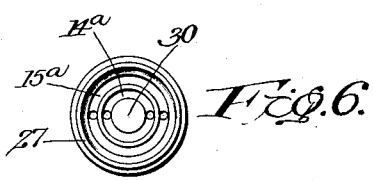
Inventor
A. F. Jenkins
By Foster Freeman Watson Flint
Attorney

UNITED STATES PATENT OFFICE.

ALEXANDER F. JENKINS, OF BALTIMORE, MARYLAND.

CUTTING AND WELDING TORCH.

1,274,053.                Specification of Letters Patent.         Patented July 30, 1918.

Continuation in part of application Serial No. 114,214, filed August 10, 1916. This application filed February 21, 1918. Serial No. 218,489.

*To all whom it may concern:*

Be it known that I, ALEXANDER F. JENKINS, a citizen of the United States, and residing at Baltimore, State of Maryland, have invented certain new and useful Improvements in Cutting and Welding Torches, of which the following is a specification.

My present invention comprises an acetylene cutting and welding torch having interchangeable tips for cutting and welding respectively.

The object of the invention is to simplify and cheapen the structure of such apparatus, to render them more efficient, and to adapt the same torch in a convenient manner to either cutting or welding.

The invention will be described in connection with the accompanying drawing, in which:

Figure 1 is a sectional view of the head of a torch with a cutting tip attached;

Fig. 2 is a partial section on a plane at right angles to Fig. 1;

Fig. 3 is a bottom plan view of the torch head;

Fig. 4 is a top plan view of the cutting tip shown in Figs. 1 and 2;

Fig. 5 is a sectional view similar to Fig. 1 but showing a welding tip substituted for the cutting tip of Fig. 1;

Fig. 6 is a top plan view of the tip shown in Fig. 5;

Figs. 7 and 8 are longitudinal sectional views of welding tips embodying the invention and adapted to be substituted for the tips shown in Figs. 1, 2 and 5.

The torch head A is a solid block of metal adapted to receive the pipe or tube 10 to supply oxygen for cutting purposes and also tapped to receive pipes 11 and 12 to supply acetylene and oxygen, respectively, for heating or welding purposes. The head is preferably a right angle structure having, in the position shown in the drawing, a horizontal arm to which the pipes 10, 11 and 12 are connected, and a vertical arm to the lower end of which the tips are connected. The lower end of the vertical arm has a seating face for the tips having a central opening 13 and annular grooves 14, 15. A central right angled passage 16 connects the central opening 13 with the tube 10 which supplies high pressure oxygen for cutting purposes. The grooves 14, 15, are connected by passages 17, 18, with the pipes 12 and 11 respectively. The passages 16, 17 and 18 are drilled in the solid head A. Adjacent the seat for the tip the head is threaded at 19 to receive a threaded union 20 having an inturned flange 21 which engages a shoulder on the tip. Surrounding the seat on the head is a groove 22 to receive a flange on the tip, the outer marginal wall 23 of the head being carried down below the seating face to protect said face from injury when the coupling 20 and the tip are removed.

The tip B shown in Figs. 1, 2 and 4 has a central or axial passage 24 for cutting oxygen which is alined with the vertical branch of the passage 16, and it has one or more side passages 25 which are branched at the upper end to communicate with the grooves 14, 15, to receive both oxygen and acetylene which are mixed in the passage 25. The tip is also provided with a shoulder 26 to be engaged by the lip 21 of the coupling 20 and with a marginal axially projecting flange 27, which protects the seating face 28 of the tip when the latter is detached and which extends into the groove 22 when the parts are assembled, as shown in Figs. 1 and 2. The annular flanges 23 and 27 telescope and assist in preventing the escape of gas, in addition to their function of protecting the abutting faces of the head and tip.

When it is desired to adapt the torch for welding only the cutting oxygen is required to be shut off, and to accomplish this in the simplest and cheapest and also most effective manner, I provide a special tip as shown in Figs. 5 to 8 inclusive, in various forms, in which there is no central opening and which therefore closes the oxygen passage 16 securely when the tip is connected to the head, as shown in Fig. 5. The tip B', shown in Figs. 5 and 6, is of exactly the same construction as that shown in Figs. 1 and 2, excepting that the central portion 30 of its seating face is solid and adapted to securely close the oxygen passage 16. This tip has two side passages 25$^a$ which are branched at their upper ends to receive the gas and oxygen from the pipes 11 and 12. These bores 25$^a$ converge and unite in a single bore 31 at the free end of the tip.

The tip B$^2$ shown in Fig. 7 is the same as that shown in Fig. 5, excepting that it has but one mixture passage 25$^b$ branched at the upper end to receive oxygen and acetylene, for welding or heating purposes. The tip B³ shown in Fig. 8 is the same as that shown in Fig. 7, excepting that the passage 25ᶜ is at right angles to the seating face of the tip. In this figure the broken line 32 indicates the axis of the tip at right angles to its seating face and the bore or conduit 25ᶜ is parallel to its axis. In each of the tips shown in Figs. 5 to 8 inclusive, the seating face of the tip is provided with annular grooves 14ᵃ, 15ᵃ, to register with the grooves 14, 15 in the head and to supplement these and provide free flow of gases to the openings in the tips. The annular partitions between the grooves 14ᵃ, 15ᵃ are adapted to fit against the annular partitions between the grooves 14 and 15 in the head. The central portion 30 of the face of each tip B′, B², B³ is flat and without any perforation and adapted to close the high pressure oxygen or cutting oxygen passage 16.

I prefer to provide the various tips with straight passages 25, 25ᵃ, 25ᵇ, 25ᶜ communicating with the oxygen grooves 14, 14ᵃ and to bring the acetylene gas into these passages by inclined or angular passages communicating with the annular grooves 15, 15ᵃ as this arrangement gives the best mixing and most effective heating results.

In changing from a cutting to a welding torch or vice versa, it is simply necessary to remove the union or coupling and exchange tips and replace the coupling securely. The annular grooves in the face of the head convey the gases to the conduits in the tip regardless of the angular position of the latter, and hence it is not necessary to pay any attention to the angular position on the head.

This application is a continuation, in part, of my pending application Serial No. 114,214, filed August 10, 1916, allowed November 12, 1917.

Having thus described my invention what I desire to secure by Letters Patent is:

1. In a welding and cutting torch, the combination with a solid head having a face provided with annular grooves and a central opening, passages in said head to convey gases to said grooves and opening, and a welding or heating tip having a face adapted to fit against the marginal partitions of said grooves, a solid portion of said face being adapted to block off one of the passages in the head, and passages in said tip to receive and convey gases from the remaining passages in the head.

2. In combination in an acetylene welding and cutting torch, with a head having a passage for cutting oxygen and passages for welding gases, of a removable tip, and means for connecting the same to the head, said tip having a solid portion to block off the cutting oxygen, and passages to receive the welding gases and convey them to the extremity of the tip.

3. In a cutting and welding torch, the combination with a right angled head having angular passages therein for cutting and welding gases, a seating face for a tip, the passage for cutting gas having an outlet centrally arranged on said seating face, interchangeable cutting and welding tips having faces adapted to said seating face, and means for detachably connecting either tip to the head, the cutting tip having a central passage for cutting oxygen and passages for the heating gases and the welding tip having passages for the heating gases, and a central solid portion on its face adapted to block off the cutting oxygen.

4. In combination in an acetylene welding and cutting torch, with a head having a central passage for cutting oxygen and side passages for welding gases, of a removable tip, and means for connecting the same to the head, said tip having a central solid portion to block off the central oxygen passage in the head, a straight side passage for the welding oxygen, and a branch to said straight passage to conduct into said straight passage the fuel gas for welding.

In testimony whereof I affix my signature.

ALEXANDER F. JENKINS.